Oct. 12, 1937.                    W. LENZ                    2,095,820
              CONTROL MECHANISM FOR MULTIPLE HYDRAULIC GEARS
                            Filed July 29, 1935
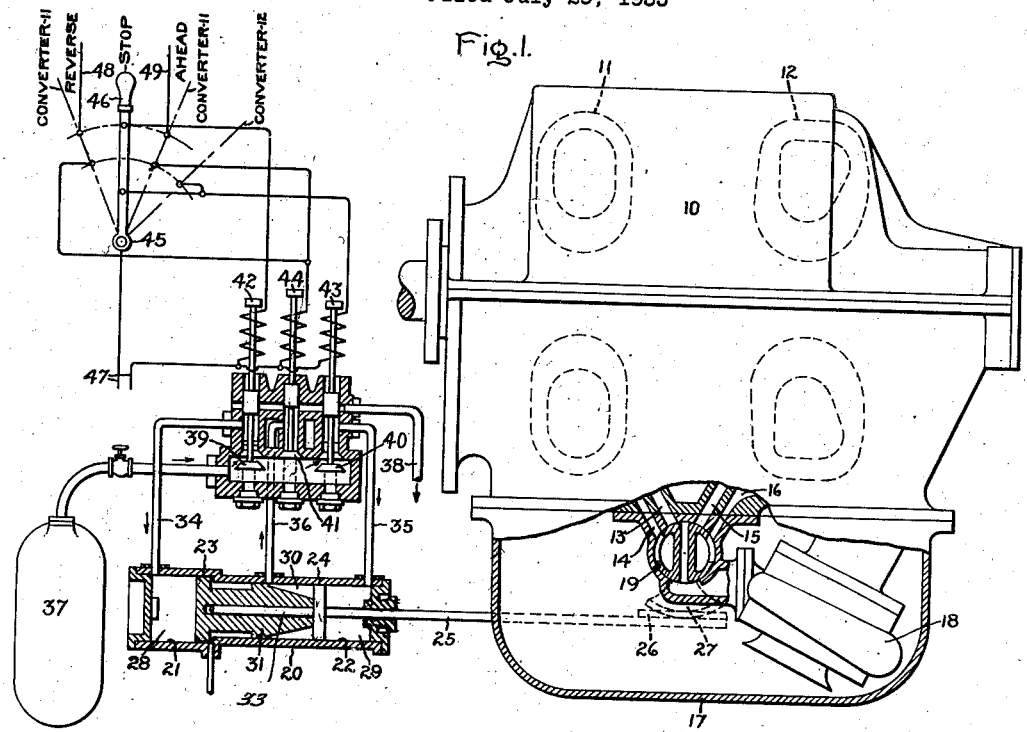
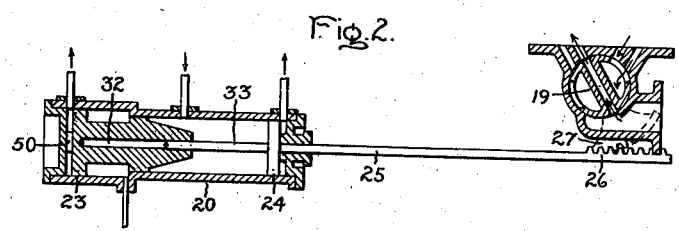
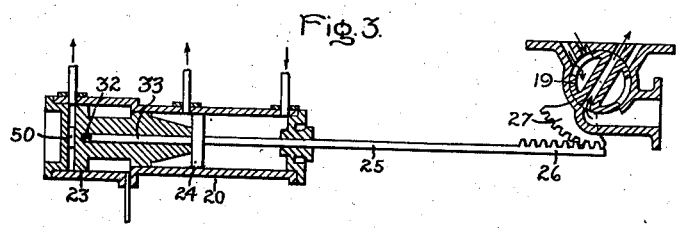
Inventor:
Walter Lenz,
by Harry E. Dunham
His Attorney.

Patented Oct. 12, 1937

2,095,820

UNITED STATES PATENT OFFICE 2,095,820

CONTROL MECHANISM FOR MULTIPLE HYDRAULIC GEARS

Walter Lenz, Berlin, Germany, assignor to General Electric Company, a corporation of New York Application July 29, 1935, Serial No. 33,769
In Germany August 23, 1934

3 Claims. (Cl. 121—38)

The present invention relates to control mechanisms for multiple hydraulic gears, couplings or torque converters such as are used for operating vehicles in forward and reverse direction. More specifically the invention relates to the kind of drives which have at least two forward or ahead operating positions or shifts for different speeds and a reverse position.

The object of my invention is to provide an improved construction and arrangement of control mechanism for controlling the operation of multiple hydraulic gears.

For a consideration of what I believe to be novel and my invention, attention is directed to the following description and the claims appended thereto in connection with the accompanying drawing.

In the drawing, Fig. 1 illustrates partly diagrammatic and partly in section a control mechanism for a multiple hydraulic gear in accordance with my invention; Figs. 2 and 3 show different operating positions of certain parts of Fig. 1.

The arrangement comprises a multiple hydraulic gear or torque converter unit 10 including two turbo type torque converters or transmitters 11 and 12 such as may be used for driving a vehicle. Operating fluid which may be oil, water or like liquid is conducted to the hydraulic torque converter 11 through a channel 13 and discharged therefrom through a channel 14. Similarly, operating fluid is conducted to the hydraulic torque converter 12 through a channel 15 and discharged therefrom through a channel 16. The operating fluid for the two converters is contained in a pan 17 secured to the bottom of the common casing for the two converters. The fluid is forced from the pan 17 into either of the converters by the action of a pump 18 and the flow of fluid to the converters is controlled by a valve 19. The valve in Fig. 1 is shown in neutral position in which fluid from both converters is discharged into the pan. Fig. 2 shows the valve 19 in a position in which fluid is conducted to the converter 11, and Fig. 3 illustrates a position in which fluid is conducted to the converter 12 and at the same time discharged from the converter 11.

The valve 19 is controlled in accordance with my invention by a special servo-motor 20. This motor comprises a cylinder which has a portion 21 of larger inner diameter and a portion 22 of smaller inner diameter. Two separate pistons 23 and 24 are slidably disposed within the portions 21 and 22 respectively, the piston 23 being larger in diameter and the piston 24 smaller. Due to the different piston diameters a smaller pressure is necessary for actuating or moving the piston 23 than the piston 24. The piston 24, which has the smaller diameter, is connected to one end of a rod 25, the other end of which is provided with a toothed rack 26 meshing with a segmental gear 27 secured to the valve 19 so that movement of the piston 24 causes turning movement of the rack 27 and accordingly of the valve 19. The servo-motor forms three control chambers, a chamber 28 at the left-hand end adjacent the piston 23, a chamber 29 at the right-hand end adjacent the piston 24, and an intermediate chamber 30 between the two pistons 23 and 24. The piston 23, as shown in the drawing, has an axial extension 31 with a bore 32 and the piston 24 has a projection 33 which forms in substance a continuation of the stem 25. This projection is guided in the bore 32 of the piston 31 to maintain alignment of the two pistons. Actuating fluid is supplied to and discharged from the chambers 28, 29, and 30 by means including conduits 34, 35, and 36 respectively. All of these conduits receive actuating fluid under pressure from a container 37 and discharge the fluid to a suitable point, for instance the atmosphere, through a conduit 38. The displacement of fluid in the different chambers is controlled by valves 39, 40, and 41 respectively. These valves have stems secured to electromagnets 42, 43, and 44 respectively. The energizing coils of the electromagnets are connected to a switch 45 having a lever 46. The arrangement in Fig. 1 is shown in the neutral or stop position. In this case the lever 46 closes electric circuits to energize electromagnets 42 and 43 from a suitable source of electric energy 47. Energizing of the electromagnets 42 and 43 causes opening of the corresponding valves 39, 40 so that actuating fluid under pressure is supplied from the container 37 to the chambers 28 and 29 respectively. The two pistons 23 and 24 thereby are forced into a central position, the piston 23 in this position forming a stop for the piston 24, movement of the piston 23 towards the right being limited by the cylinder wall. As stated before, the valve 19 in stop or neutral position permits the discharge of actuating fluid from both torque converters. To start operation the lever 46 is turned clockwise or counterclockwise into one of the positions "converter 11", depending upon whether ahead or reverse operation is desired. This causes at first positioning of a coupling, not shown, in forward or reverse position through the conductors 48 and 49 respectively. The lever 46 when moved into ahead position causes de-energization of the electromagnets 42 and 43 and simultaneously energization of the electromagnet 44 whereby the valves 39 and 40 are closed and the valve 41 is opened. This effects the discharge of fluid from the chambers 28 and 29 and the supply of fluid under pressure into the intermediate chamber 30, resulting in outward movement of the two pistons into the position shown in Fig. 2 in which the valve 19 has been turned to permit the supply of operating fluid to the converter 11. When the lever 46 is in forward position it is left in this position until a certain speed has been reached, usually half the full speed at which the converter 11 reaches the limit of its best efficiency. To increase the speed, the lever 46 is turned further in clockwise direction into the position "converter 12". In this position the circuits for the electromagnets 42, 44 are interrupted and the circuit for the electromagnet 43 is closed. This effects closing of the valves 39 and 41 and opening of the valve 40. The actuating fluid, such as air, then contained in the chamber 30 is discharged to atmosphere, whereas actuating medium is supplied through the valve 40 and the conduit 35 to the control chamber 29. The piston 24 then is forced towards the left against the piston 23 until both pistons reach the end position, shown in Fig. 3, in which the left-hand face of the piston 23 engages a stop 50 secured to the cylinder cover. Under this condition the valve 19 has been turned by the rack 26 and the segmental gear 27 into a position in which actuating fluid is supplied through the channel 15 to the converter 12 and discharged from the converter 11 through the channels 13 and 14. When it is desired to reduce the speed of the vehicle driven by the converters, the lever 46 is turned in counter-clockwise direction from the position "converter 12" to the ahead position "converter 11" whereby the servo-motor 20 and the valve 19 are moved from the position shown in Fig. 3 into that shown in Fig. 2.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. A servo-motor for operating a plurality of hydraulic torque converters comprising a cylinder, two separate pistons movably disposed in the cylinder and defining a chamber between them, a projection with an axial dead end bore on one piston facing the other piston, the piston rod for the other piston projecting on one side through the cylinder end wall and on the other side into the dead end bore to maintain alignment of the two pistons and means for conducting actuating fluid to the chamber and to the ends of the cylinder.

2. A hydraulic torque converter arrangement comprising two converters, means for supplying and controlling the supply of operating fluid to the converters, said means comprising a valve arranged to permit in a certain position the discharge of fluid from both converters and in other positions the supply of fluid to one converter and the discharge of fluid from the other converter, and a control mechanism for the valve comprising a servo-motor having a cylinder, two independent pistons of different diameters disposed in the cylinder, means including a rod connecting the smaller of the pistons to the valve, a source of actuating fluid under pressure, means for conducting and controlling the flow of fluid under pressure to the ends and to an intermediate portion of the cylinder and auxiliary means for maintaining alignment of the pistons, said auxiliary means comprising a projection with an axial dead end bore on the larger piston adjacent the smaller piston and an extension of said rod projecting into and having sliding fit with said bore.

3. A servo-motor comprising a cylinder having a first portion with a large bore and a second portion with a small bore, a first piston of large diameter disposed in the first portion, a second piston of small diameter disposed in the second portion, means limiting movement of the second piston and maintaining alignment of the two pistons comprising a projection on the first piston having an axial dead end bore and a rod connected to the second piston and having an extension with a sliding fit in said bore, an intermediate portion of said projection having a sliding fit with the wall of the second cylinder portion, and means for conducting fluid to and discharging fluid from the three spaces defined by the pistons and the cylinder.

WALTER LENZ.